July 4, 1939.  F. V. SUCHANEK  2,164,435
RUMBLE SEAT METHOD AND MEANS
Filed Nov. 6, 1936  2 Sheets-Sheet 2
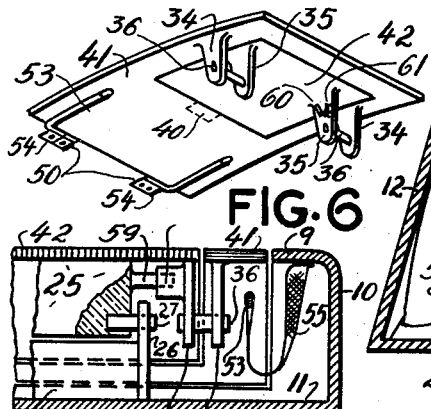
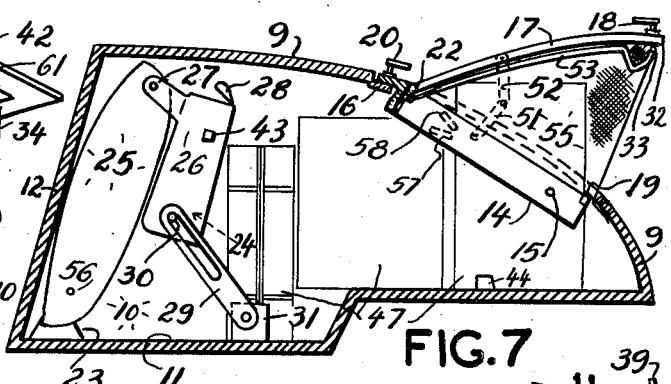
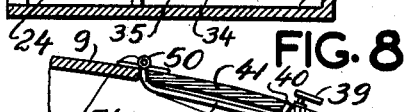
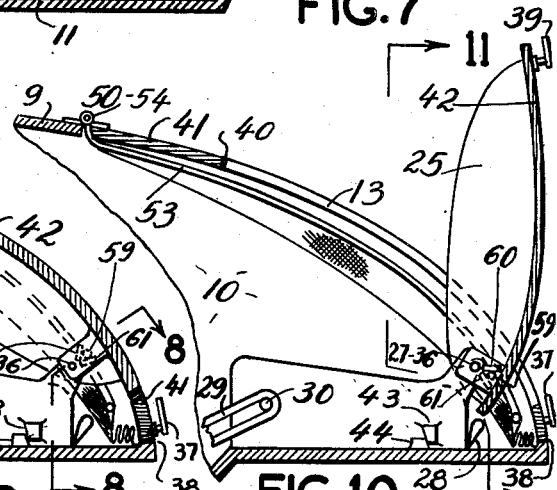
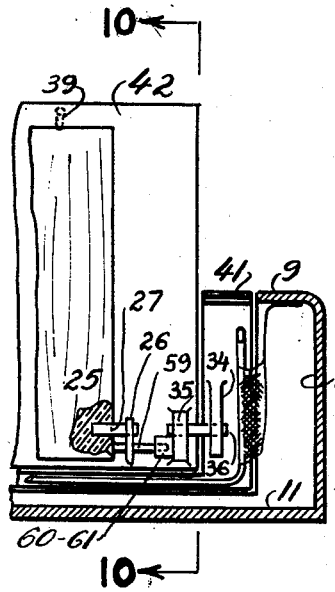
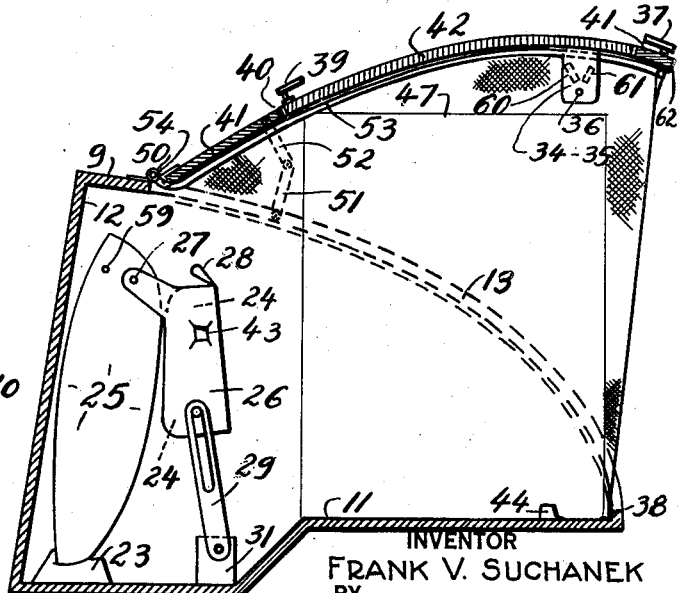
INVENTOR
FRANK V. SUCHANEK
BY Ray Belmont Whitman
ATTORNEY Patented July 4, 1939

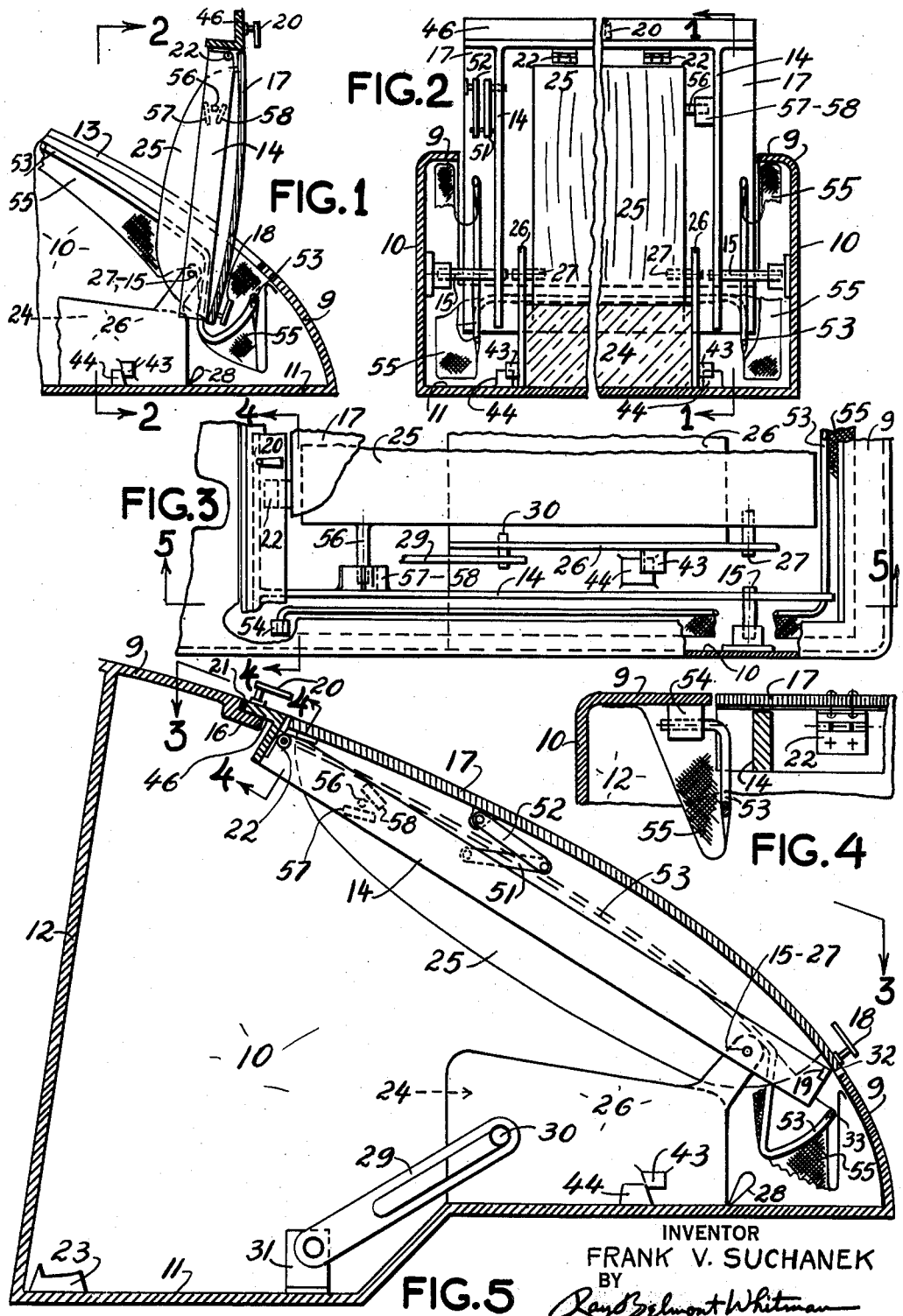

2,164,435

UNITED STATES PATENT OFFICE 2,164,435

RUMBLE SEAT METHOD AND MEANS

Frank V. Suchanek, New Rochelle, N. Y.

Application November 6, 1936, Serial No. 109,403

3 Claims. (Cl. 296—66)

This invention relates to vehicle bodies, and more especially to a method and means for providing a combined rumble seat and storage space in an automobile body.

An object of the invention is to provide both a rumble seat and storage compartment in the body of an automobile or other vehicle, particularly of the cabriolet, coupé, or roadster type.

Another object is to provide a rumble seat in a car, which can be folded out of the way when the space is needed for storage.

Another object is to provide protected and covered storage space projecting from the body of the car.

A further object is to equip an automobile with means both for carrying extra passengers in the rear, or for carrying parcels or other objects, and which can be conveniently converted without loss of time from one use to the other.

Yet another object is to provide means and a method of folding the seats or seat members into the least desirable space, so as to leave the most accessible space free for ready storage of articles.

All these and other objects, as suggested hereinbelow, are attained by the method and means now to be described, and illustrated in the accompanying drawings, in which—

Figure 1 is a vertical longitudinal section of a portion of a car body showing the rumble seat of this invention in open position.

Fig. 2 is a vertical sectional elevation of the same, through the line 2—2 of Fig. 1.

Fig. 3 is a fragmentary horizontal sectional view of the rumble seat in closed position, through the line 3—3 of Fig. 5.

Fig. 4 is a detail sectional view, through the line 4—4 of Figs. 3 and 5, showing the co-axiability of the hinges of the curtain and U-shaped members.

Fig. 5 is a sectional view like that of Fig. 1, but through 5—5 of Fig. 3, with the rumble seat closed.

Fig. 6 is a perspective view of part of a modified form of the invention, showing the cover and frame and both sets of lugs.

Fig. 7 is a vertical longitudinal section of a portion of a car body, containing the first-described form of the invention, showing the rumble seat folded away, luggage stacked inside, and the cover and curtain member raised.

Fig. 8 is a sectional view of the modified form, along the line 8—8 of Fig. 9, showing the co-axiability of the back cushion pivots and lug pivots.

Fig. 9 is a view similar to Fig. 5, but showing the rumble seat closed, in the modified form.

Fig. 10 is a view similar to Fig. 9, but showing the rumble seat open, being taken through the lines 10—10 of Fig. 11.

Fig. 11 is a detail section, through the line 11—11 of Fig. 10.

And Fig. 12 is a longitudinal section showing the rumble seat folded away, the luggage stacked inside, and the cover and curtain member raised.

Like numerals refer to like parts throughout the several views.

The three principal parts of this invention are the rear deck, the swingable cover, and the foldable rumble seat. They will be described in this order.

The rear deck consists of the floor 11, Fig. 5, the walls 10—10, the partition 12 which separates the rear deck from the driver's seat, a rearwardly-slanted top 9 with an opening 13, Fig. 1. The upper side frame of the opening 13 has an underslung edge 16, Fig. 5, which supports the lip 46 of a U-shaped frame 14. The floor 11 supports pivots 31—31, stoppers 44 for the seat, and also if needed other stoppers (not shown) for the frame and back cushion. The walls 10—10 support the pivots 15—15 for the frame 14, Fig. 3.

The top 9 carries the striker 21 of the latch 20. Brace 51 is pivotally attached to one side of the frame 14. The other end of the brace 51, Fig. 7, is pivotally connected to a companion brace 52, which in turn is attached pivotally to the cover 17.

Braces 51—52 support the cover 17 in open position (Fig. 7). When the cover 17 is closed the braces 51—52 are folded adjacent to each other, as shown in Fig. 5. In Fig. 12, the braces support cover 41 as shown.

The swingable cover 17 is curved in the same shape as the adjacent top 9. Cover 17 is hinged at 22 to the frame 14, and carries a latch 18 whose striker 19 is part of said frame (Fig. 5).

Frame 14 is pivotally connected at 15—15 with the walls 10—10, Fig. 2. From the upper edge of the frame there extends a lip 46 which carries the latch 20, the striker 21 of which is carried by the underslung edge 16. Thus lip 46 is supported by edge 16 of top 9, which acts as a stopper.

By releasing latch 18, Fig. 7, the cover 17 is swingable out of the frame 14, on its hinges 22, being supported in open position by braces 51—52; and the cover can be positively locked to the frame by means of latch 18 with its striker 19. The cover is also swingable with frame 14 around pivots 15—15, after releasing latch 20. And the frame 14 can be locked to the rear deck by means of latch 20—21.

The rumble seat, Fig. 2, consists of a seat 24 carrying sides 26—26 which are pivotally connected at 27—27 with the back cushion 25. Seat 24 has an operating handle 28. The sides 26—26 carry nose-shaped extensions 43—43 adapted to engage stoppers 44—44 attached to floor 11. See Figs. 1 and 2.

Pivots 27—27 of the back cushion are in alignment with pivots 15—15 of the frame 14. And the back cushion carries a finger 56 which fits between two pushers 57—58 attached to frame 14.

The operation of the rumble seat will now be described.

Fig. 5 shows the rumble seat closed. If it is desired to open it, the operator releases latch 20 from striker 21, thus releasing frame 14 and cover 17. Then pulling latch 20 upwardly swings frame 14 and cover 17 around pivots 15. Cover 17, frame 14, or both of them exercise a pressure on the lower part of the cushioned back 25 until cover 14, frame 17, and back 25 get into the position shown in Figs. 1 and 2. Or pusher 57 engages 56 for the same purpose. Any forward thrust on the seat 24 resulting from the pressure on the back 25 is caught by the nose 43 and stopper 44.

To close the rumble seat the operator presses on the latch 20, which in turn moves the frame 14, cover 17, and back cushion 25—by means of pressure on the upper part of cushion 25— until said members reach the position shown in Fig. 5. Or pusher 58 engages 56 for the same purpose. Latches 18—20 hold the cover closed; and edge 16 supports the lip 46 of frame 14.

When it is desired to use the rear deck as a storage space, the operator releases the latch 18, Fig. 7, from the striker 19, and lifts the cover 17 around the hinges 22. Braces 51—52 then hold the cover in this position. Then the operator grips the rumble seat by means of holder 28, moving seat 24, sides 26, and cushion 25, and lifts the nose 43 over the stopper 44, and slides the complete rumble seat by means of its pivots 30—30 sliding in the slotted levers 29—29, finally pushing the seat into the position shown in Fig. 7. In this position the back 25 is supported by stopper 23.

Now the rumble seat is folded out of the way, and the space can be used for storage purposes. The cover 17 can be closed by folding the braces 51—52, and locked if desired by means of latch 18 and striker 19.

A valuable additional feature of this invention is the certain element 53, Fig. 9, which is hinged at 54 to the top 9, and this hinge is co-axial with the hinge 50 of frame 41, in the modified form described herebelow, and with the hinge of the U-shaped member in the form described above. An irregularly-shaped piece of waterproof canvas 55, reinforced with metal mesh, has one end attached to the said curtain element, and the other end to the under side of the top 9.

In its inoperative position as shown in Fig. 9, the curtain element 53 and canvas 55 are inside the rear deck. Now, if some large-sized article or piece of luggage 47 stored under the rear deck, projects as shown in Fig. 12, the cover 41 with its member 42 cannot be entirely closed. In this case the curtain element 53 with its canvas 55 are raised until they contact the outside cover 41. A lock 62 is attached to the cover 41, its striker being on element 53. These serve to hold the curtain element 53 and canvas 55 together with the cover 41. Thus the contents are protected from rain or snow, or from theft. In Fig. 7, the lock 32 on cover 17 has its striker 33 on curtain 53.

A modified form of the invention is used when it is desired to equip the rear deck with an extra large cover—as, for instance, in business coupés. This variation is shown in Figs. 6, and 8 to 12, inclusive, and will now be described.

In this form, top 9 has opening 13, Fig. 12, and carries cover 41 hinged at 50. Cover 41 has a latch 37, and its striker 38 is attached to the bottom of top 9. Inside the big cover 41 is an inside cover 42, both of which have the same curvature. Cover 41 has lugs 34, Fig. 6, and inside cover 42 has lugs 35. Lugs 34 and 35 are pivotally connected at 36 to permit the inside cover 42 to swing outwardly in respect to cover 41, Fig. 10. Cover 42 is equipped with latch 39, and its striker 40 is attached to cover 41.

Pivots 36—36, Fig. 11, of lugs 34—35 are in line with pivots 27—27 of the rumble seat. The inside cover 42 sits saddle-like over the back cushion 25.

The operation of this modification will now be described.

The opening of the inside cover 42, Fig. 9, around its pivots 36—36 exercises a pressure on the lower part of back cushion 25, and lifts it into the open or vertical position shown in Fig. 10. Or pusher 60 attached to lug 35 engages finger 59 attached to the back cushion 25, for the same purpose. See Figs. 9 and 10.

The closing of the cover 42 exercises a pressure on the upper part of the cushion back 25 and closes it. Or pusher 61 attached to lug 35 exercises a pressure on finger 59 for the same purpose.

If it is desired to use the rear deck for storage purposes, the cover 41, Fig. 12, lugs 34—35, pivots 36—36, and inside cover 42 are lifted. The cover is supported in this position by braces 51—52, the same as is cover 17 in Fig. 7. The rumble seat can then be folded away to the position shown in Fig. 12. Or, when the partition 12 is kinked or out of a plane, the rumble seat may be reversed to better fit the space. In such case, the space in the kink or offset (not shown) can be used as a drawer accessible from the inside of the car, or for storing of the tops of roadsters, for instance.

It is to be understood that the present disclosure is for the purpose of illustration only, and that the invention is not limited thereto. To those skilled in the art, many modifications of the invention will be readily apparent, and it will also be obvious to such skilled persons that parts of the device may be used without other parts thereof, and steps in the method, without other steps, many such combinations readily suggesting themselves. Therefore, it should be and is to be distinctly understood that for a definition of the limitations of the invention, reference must be had to the appended claims.

Having now described the invention, what is claimed as new, and for which Letters Patent of the United States is desired, is:

1. In a vehicle body, a rear deck storage compartment comprising side walls, top, and floor, an opening in the top, a frame-like cover in the opening and hinged to the upper front edge of the top and being swingable from a position overlying the top upwardly and out of said storage compartment, a solid cover positioned within the opening of the frame-like cover and pivoted thereto so as to be movable from a position closing the opening to a substantially vertical position, a rumble seat comprising bottom and back members normally placed horizontally beneath the solid cover, means permitting both said seat members to be shifted away from beneath the opening, the back member being movable on pivots to permit its movement to a vertical position in the opening when the solid cover is up, said pivots being co-axial with those of the solid cover, said cover and back members being so disposed that movement of said cover from a closing position in the frame-like cover to a substantially vertical position exercises a pressure on the seat back member to raise it from horizontal to substantially vertical position, and vice versa.

2. A rear deck for a vehicle, comprising a top, an opening in the top, a cover overlying the opening, the cover being adapted to be moved from a position overlying the opening into substantially vertical position, a rumble seat comprising seat and back members both placed horizontally beneath the opening, means permitting their movement away from beneath the opening, the back member being disposed in such manner that the movement of the cover from said overlying to said vertical position exercises a pressure on the back member to raise it from horizontal to vertical position, and vice versa.

3. In combination, a rear deck for a vehicle, an opening therein, a cover adapted to fit the opening and adapted to be moved to a position either to close it or to be swung upwardly and outwardly into substantially horizontal position or to be turned about a pivotal axis parallel with the lower edge of the opening into substantially vertical position, a rumble seat comprising bottom and back members both adapted to be placed horizontally under the opening, means permitting their removal from beneath the opening, the back member being pivotally held to permit it to be turned from horizontal to substantially vertical position, said pivoting means and seat back to be disposed in respect to the cover in such manner that movement of the latter from closed to vertical position actuates the seat back to move it from horizontal into vertical position, and vice versa.

FRANK V. SUCHANEK.